United States Patent [19]

Branscome et al.

[11] 3,991,271

[45] Nov. 9, 1976

[54] VOICE SECURITY METHOD AND SYSTEM

[75] Inventors: Kenneth M. Branscome, Dallas; William M. Feath, Irving; George E. Goode, Richardson; Kenneth W. Heizer; Barrie O. Morgan, both of Dallas, all of Tex.

[73] Assignee: Datotek, Inc., Dallas, Tex.

[22] Filed: Jan. 29, 1975

[21] Appl. No.: 545,083

Related U.S. Application Data

[62] Division of Ser. No. 293,412, Sept. 29, 1972, Pat. No. 3,886,313.

[52] U.S. Cl. .............................. 178/69.5 R; 325/32; 325/58; 179/1.5 R; 178/22

[51] Int. Cl.[2] .............................. H04L 9/00

[58] Field of Search .............................. 179/1.5 S, 1.5 R; 178/22, 69.5 R; 325/32, 58; 340/146.2; 235/181

[56] References Cited

UNITED STATES PATENTS

| | | | |
|---|---|---|---|
| 2,411,683 | 11/1946 | Guanella | 179/1.5 R |
| 3,463,911 | 8/1969 | Duproz et al. | 235/181 |
| 3,586,776 | 6/1971 | Salava | 178/69.5 R |
| 3,773,977 | 11/1973 | Guanella | 178/22 |

*Primary Examiner*—H.A. Birmiel
*Attorney, Agent, or Firm*—Richards, Harris and Medlock

[57] ABSTRACT

The specification discloses a voice scrambler technique wherein a voice signal is split into a plurality of discrete frequency sub-bands. A random code genertor generates a randomized sequence of digital signals. A preselected first portion of each of the digital signals is utiized to control the rearrangement of the order of the frequency sub-bands according to a limited subset of all possible combinations of rearrangements of the frequency sub-bands. The limited subset is chosen to include only the most unintelligible of the possible combinations of rearrangements of the frequency sub-bands. A preselected second portion of each of the digital signals is utilized to control the random inversion of ones of the frequency sub-bands. The rearranged and inverted frequency sub-bands are then transmitted over a conventional voice communication line to a similar voice scrambler unit which operates in synchronism to rearrange and invert the frequency sub-bands to the original state in order to render the voice signal intelligible. The system includes a unique synchronism technique which automatically compensates for time delays in transmission and which allows tolerance of transmission errors, with the randomized signal generator being rapidly stepped prior to initial transmission to generate a prime word, the rapid advancement serving to compensate for transmission path delay.

6 Claims, 9 Drawing Figures

VOICE SECURITY METHOD AND SYSTEM

This is a division of application Ser. No. 293,412, filed Sept. 29, 1972 now U.S. Pat. No. 3,886,313.

FIELD OF THE INVENTION

This invention relates to the secure transmission of audio signals, and more particularly relates to a method and system utilizing a randomized stream of digital signals to vary the rearrangement and inversion of subbands of a voice frequency band.

THE PRIOR ART

It is important in many areas of government and business to ensure that voice messages may be transmitted to a remote location with a high degree of privacy. Thus, systems have previously been developed wherein a voice signal is divided into a plurality of sub-bands and the order of the sub-bands is then randomly varied in conjunction with random inversion of ones of the subbands. The reordered and inverted subbands are then transmitted over a communication link in an unintelligible state. Only a remote receiving station having a properly coded unit is able to reorder and invert the frequency sub-bands into their proper order in order to render the voice signal intelligible. Examples of such prior voice scrambling systems are described in U.S. Pats. NO. 2,411,206 and 2,510,338, issued to Guanella, and U.S. Pat. No. 2,586,475, issued to Milliquet.

However, many previously developed voice scrambling systems have not been sufficiently secure due to the lack of an adequate random code generator. Additionally, many prior voice scrambling devices have not been easily adaptable for use with both short and long communication paths, due to the propagation time delay which occurs with long communication paths. Prior voice scrambling units utilized with long communication paths, such as via an ocean telephone cable or radio satellite communication, have often been required to be full duplex systems to accommodate the long propagation times involved.

Another problem which has heretofore existed with prior voice scrambling systems is that certain permutations of the rearranged voice frequency sub-bands have resulted in intelligible speech being transmitted. For example, if only the upper frequency sub-band is inverted, or alternatively if only the upper and lower frequency sub-bands are rearranged, then a substantial amount of the uncoded voice frequency band will be transmitted and the security of the communication link will be comprised. Prior voice scrambler units have also not generally been provided with adequate alarm or fail-safe circuitry to indicate when a malfunction has occured and to prevent transmission of uncoded voice data.

SUMMARY OF THE INVENTION

In accordance with the present invention, a voice scrambler unit is provided which substantially eliminates or reduces the problems encountered with prior voice scrambler systems. The present voice scrambler device utilizes accurate digital code techniques to maintain synchronization over a wide range of distances, including long distance worldwide circuits wherein transmission times as well as signal variations may be significant. In order to eliminate the possibility of intelligible speech being transmitted due to the use of a coding permutation which provides inferior coding results, the present system utilizes only a subset of coding permutations which provide the most unintelligible voice scrambling results. The present system also includes alarm and fail-safe circuitry in order to indicate when a malfunction has occurred and to prevent transmission of uncoded voice data in case of a malfunction.

In accordance with a more specific aspect of the present invention, a voice scrambler system includes filters for splitting a voice signal into a plurality of discrete frequency sub-bands. A random code generator generates a randomized sequence of digital signals. Circuitry is responsive to preselected first portion of each of the digital signals for rearranging the order of the frequency sub-bands according to a limited subset of all possible combinations of rearrangements of the frequency sub-bands. The limited subset chosen for use with the system includes only the most unintelligible of the possible combinations. Circuitry is responsive to a preselected second portion of each of the digital signals for random inverting selected ones of the frequency sub-bands.

In accordance with another aspect of the invention, a system is provided wherein a voice signal is split into a plurality of frequency sub-bands and the order of the frequency sub-bands is rearranged according to a randomized signal. The system includes a cyclically operable sequential stepping circuit for generating the randomized signal. Circuitry is provided to rapidly advance the stepping circuit a predetermined number of steps prior to initial transmission of voice data in order to generate a randomized digital prime word. The prime word is transmitted to the remote location for comparison with a stored randomized digital word in order to provide synchronization between the two stations.

In accordance with yet another aspect of the invention a voice scrambler system includes filters for splitting a voice signal into a plurality of discrete frequency sub-bands. A random code generator generates randomized digital signals. Circuitry is responsive to the digital signals for randomly rearranging the order of the frequency sub-bands and for randomly inverting ones of the frequency bands. Circuitry is responsive to the output of the code generator for normally generating a periodic tone signal and for generating a constant alarm tone when a malfunction is detected at the output of the code generator.

In accordance with yet another aspect of the invention, a voice security system includes a plurality of filters for splitting a voice signal into a plurality of discrete frequency sub-bands. A plurality of generators each generate a predetermined tone frequency and circuitry is provided to divide each of the tone frequencies down into a plurality of lower tone frequencies. A code generator generates a sequence of random digital signals. Circuitry is provided to mix the lower tone frequencies with the frequency sub-bands under the control of the randomized digital signals in order to randomly rearrange and invert the frequency sub-bands.

In accordance with yet another aspect of the invention, a method is provided for determining optimum subsets of a plurality of possible arrangement permutations of frequency sub-bands of a voice frequency band for use in a voice scrambler system. The method includes grouping the possible arrangement permutations into a plurality of possible subsets while excluding preselected. forbidden arrangement permutations which provide intelligible data. The arrangement permutations of each possible subset are then cross-correlated. An articulation index is assigned to each arrangement permutation of the possible subsets having the lowest cross-correlation indices. The articulation index is proportional to the intelligibility of each of the arrangement permutations. An optimum subset is then determined by having the lowest average articulation index. The optimum subset is then used to rearrange the order of the frequency sub-bands in a voice scrambler system.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
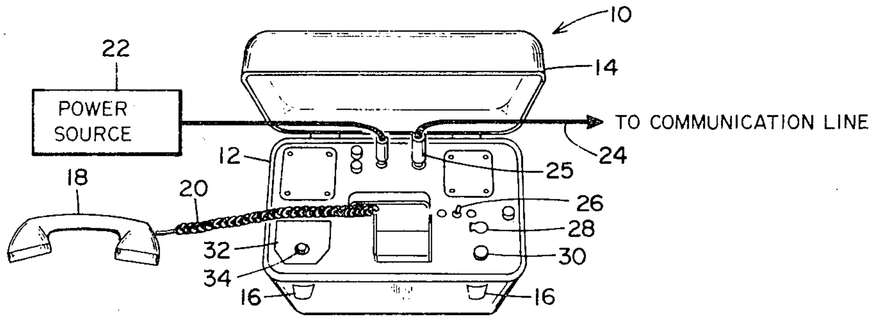
FIG. 1 is a perspective view of the present portable voice scrambler system.

Referring to FIG. 1, a perspective view of a portable voice scrambler unit 10 constructed in accordance with the present invention is illustrated. The voice scrambler unit 10 is packaged within a metal casing 12 and includes a lid 14 which may be firmly latched over the casing by latches 16. A telephone handset 18 is connected by a flexible cord 20 to the upper face of the casing 12. The voice scrambler unit may be connected to a source of AC or DC power by a lead 22, or alternatively may be operated by a battery source. The voice scrambler unit 10 is connected to a communication line by a lead 24 plugged into the interface plug 25 of the unit. The unit includes interfacing circuitry which enables connection to a wide variety of different impedences without modification of the unit. The communication line to which the unit is attached may comprise a conventional telephone line, a single side-band radio unit, a VHF/UHF radio circuits, or combination thereof.

A Push-To-Talk button is provided on the handset 18 for operation when it is desired to transmit voice information through the unit 10. When it is desired to receive information, the Push-To-Talk button is not depressed. A switch 26 may be placed in either the Private transmission position or the Clear position. When the switch 26 is in the Private transmission position, the voice data appearing on the communication line will be scrambled and unintelligible to an unauthorized listener. The voice data appearing at the handset 18 will, however, be clear and intelligible. If the switch 26 is placed in the Clear mode, the voice or speech data appearing on the communication line will not be scrambled or or encoded. If desired, an external speaker may be attached via the plug 28 on the upper part of the casing 12. A receiving volume tuning adjustment 30 may be operated to adjust the volume of the voice data appearing at the handset 18.

A panel 32 may be removed only with the insertion of a proper key into the lock 34. Behind the panel 32 is a thumbwheel switch which may be set to select any one of two million possible user codes. As will be subsequently described in more detail, the setting of the thumbwheel switch determines the operation of a random code generator contained within the casing 12. In operation, both the voice scrambler unit 10 and the voice scrambler unit at a remote location must have the same user code set into the thumbwheel switches behind the front panels 32.

Figure 2:
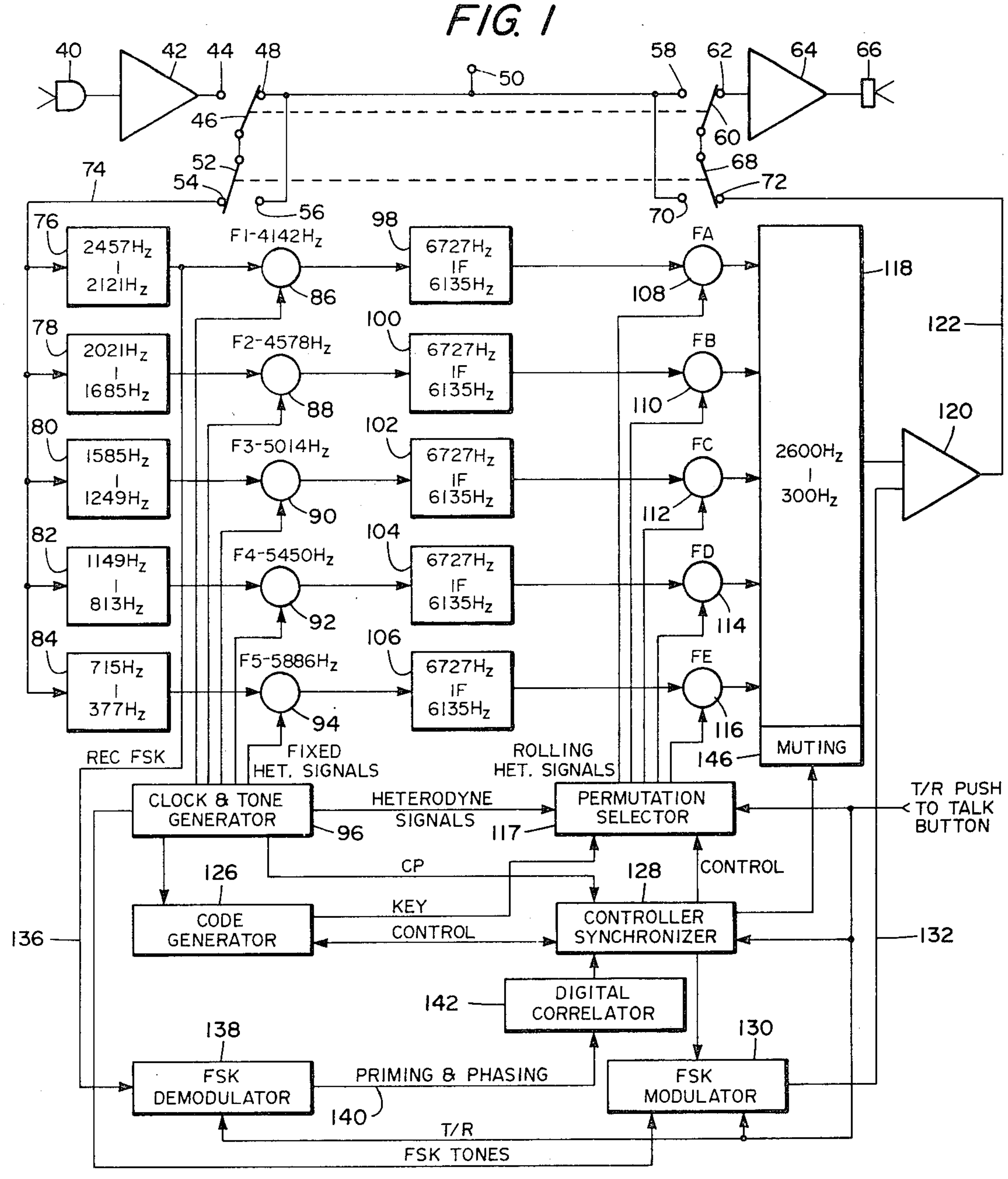
FIG. 2 is a block diagram of the present voice scrambler unit.

FIG. 2 is a block diagram of the present voice scrambler system. A microphone 40 is included in the telephone handset 18 (FIG. 1) and is adapted to receive voice signals. An amplifier 42 amplifies the output of the microphone 40 and applies the signals to a terminal 44. A switch arm 46 is movable between terminal 44 and a receive terminal 48. Terminal 48 is connected to a terminal 50 which is connected to the communication line, such as to a conventional telephone line or the like. Switch 46 is manually operated by movement of the Push-To-Talk button upon the handset 18. Switch 46 is directly tied to a switch 52 which is movable between a Private terminal 54 and a Clear terminal 56. Switch 52 is operated by movement of the switch 26 on the upper portion of the casing 12 (FIG. 1).

Terminal 50 for connection to a communication line is connected to a Transmit terminal 58. A switch 60 is ganged with switch 46 and is operable by the Push-To-Talk button on the handset 18. Switch 60 is movable between terminal 58 and a Receive terminal 62. The Receive terminal 62 is connected to the input of an audio amplifier 64 which drives a speaker 66. The speaker 66 is located in the handset 18 shown in FIG. 1. A switch 68 is ganged with switch 52 and is movable between a Clear terminal 70 and a Private terminal 72. Clear terminal 70 is connected to the communication line terminal 50, while the Private terminal 72 is connected to the output of the scrambling circuit to be subsequently described.

The Private terminal 54 is connected via a lead 74 to the input of five band-pass filters 76, 78, 80, 82 and 84. Band-pass filter 76 passes only frequencies between 2121 Hz to 2457 Hz. Band-pass filter 78 passes only frequencies between the frequency range of 1685 Hz and 2021 Hz. Band-pass filter 80 passes only frequencies between 1249 Hz and 1585 Hz. Band-pass filter 82 passes only frequencies between the range of 813 Hz and 1149 Hz. Band-pass filter 84 passes only frequencies between the range of 377 Hz and 715 Hz. The voice spectrum applied via lead 74 to the filters 76–84 is thus split into five frequency sub-bands each about 430 Hz wide.

The five sub-bands are then respectively applied to five balanced mixers 86, 88, 90, 92 and 94. The voice signals are heterodyned up to an intermediate frequency (IF) lying between 6135 Hz and 6727 Hz. To accomplish the heterodyning of the signals to the IF frequency, five different heterodyning signals F1–F5 are generated from the clock and tone generator 96. The tone generator 96 comprises fixed frequency oscillators which generate frequencies which are divided down to provide 10 audio tones for use in the system, as will be subsequently described. In the system being described, the signal F1 equals 4142 Hz, the signal F2 equals 4578 Hz, the signal F3 equals 5014 Hz, the signal F4 equals 5450 Hz and the signal F5 equals 5886 Hz. As is well known, the balanced mixers generate the sum and difference of the two input frequencies. The sum and difference signals are then applied to five IF band-pass filters 98, 100, 102, 104 and 106. Each of the IF band-pass filters passes only the high summed mixer product. With the use of the IF of this system, a high degree of isolation is provided between the clear and the scrambled voice signals.

The output of the IF filters are applied to a second series of five balanced mixers 108, 110, 112, 114 and 116, wherein the IF frequencies are beat with five frequencies FA–FE which are generated from the permutation selector 117. As will be subsequently described in greater detail, the frequencies FA–FE comprise a random selection of five tones out of the ten tons generated by the tone generator 96. These five tones control the rearrangement of the order of the frequency sub-bands and also randomly control the inversion of ones of the sub-bands. The heterodyning which occurs at the balanced mixers 108–116 causes sum and difference signals to be applied to a low pass-band filter 118 which filters out the high sum signals. With the IF at approximately 6000 Hz, all unwanted mixer products will lie above 6000 Hz and only the desired product will be in the range of the low pass filter, thus eliminating the requirement for a band switch. In the preferred embodiment, the low pass filter 118 passes only signals lying within the frequency range of 300–2600 Hz. The resulting signals are applied through an amplifier 120 and via lead 122 to the Private switch terminal 72.

It will thus be seen that if the Push-To-Talk switch located on the handset 18 (FIG. 1) is not depressed, the switch 46 contacts terminal 48 and switch 60 contacts terminal 62. When the unit is in the Receive mode, and the switch 26 is placed in the Private position, switch 52 contacts terminal 54 and switch 68 contacts terminal 72. Signals applied through the communication line 50 are thus fed through the switch 46 and switch 52 and via lead 74 to the filters 76–84. The signals are then split into frequency sub-bands and heterodyned to the IF frequencies and passed through the filters 98–106. The signals are then heterodyned at the mixers 108–116 to unscramble the voice signals, and the resulting clear voice signals are applied through the low pass filter 118, the amplifier 120, the lead 122 and switches 68 and 60 to the amplifier 64. The unscrambled clear speech signals are then applied through the speaker 66 to the operator.

When it is desired to receive in the Clear mode, the switches 52 and 68 are switched to the Clear terminals 56 and 70 and the voice signals applied from the communication line 50 are applield directly through the amplifier 64 to the speaker 66.

When it is desired to transmit voice data in the Private mode, the Push-To-Talk button is depressed and switch 46 contacts terminal 44 and switch 60 contacts terminal 58. Voice signals are applied through the microphone 40 and through the amplifier 42 and via the lead 74 to the five filters 76–84. The voice signals are split into five sub-bands and are heterodyned to the IF level. The signals are passed through the IF filters 98–106 and are heterodyned at mixers 108–116 according to the randomized frequency generated by the permutation selector 117. The bands are then randomly rearranged in order and randomly inverted and are applied through the low pass filter 118 to result in a scrambled voice output. The scrambled voice output is applied through the ampliflier 120 and the lead 122 for application to the communication line 50. The frequencies FA–FE supplied by the permutation selector 117 are changed every one-fourth second so that unauthorized deciphering of the scrambled voice signal being applied to the communication line 50 is extremely difficult.

The clock and tone generator 96 comprises fixed frequency crystals which generate three stable frequencies which are divided down to provide 10 frequencies utilized for tones F1–F5 and FA–FE and to provide clock signals for the remainder of the circuit. The clock and tone generator 96 also generates clock pulses for the code generator 126.

The code generator 126 generates a randomized stream of digital bits. The code generator 126 is utilized to generate an initial prime sequence of 24 random digital bits, to be subsequently described. Additionally, during operation of the system, the code generator 126 is required to periodically generate randomized nine-bit digital words for control of the permutation selection in order to randomly select the heterodyning tones to be applied to the mixers 108–116.

It is important that the random code generator 126 be able to supply a random stream with the key characters with an extremely long cycle. In the preferred embodiment, generator 126 comprises the random code generator described and claimed in applicant's copending patent application Ser. No. 134,320, filed Apr. 15, 1971, and entitled "Random Digital Code Generator," the specification of which is herein incorporated. As described more fully therein, the random code generator utilizes a plurality of autonomous sequential circuits which may be interconnected in a plurality of different configurations, each configuration being operable to generate randomized digital signals. The digital signals generated by the sequential circuits are nonlinearly combined and the resulting signal is utilized to control the interconnection of the sequential circuits in order to provide random digital sequences of extremely long cycle. A thumbwheel switch is provided on the generator which enables any one of a large number of user codes to be generated by the random code generator.

The controller synchronizer 128 determines the state in which the present voice scrambler is presently operating and provides sequential control to the various circuits of the invention. The Push-To-Talk button located on the handset 18 (FIG. 1) generates a signal which is applied to the permutation selector 117 and to the controller synchronizer 128. The clock and tone generator 96 applies two tones to the frequency shift key modulator 130. The modulator 130 operates under the control of the controller synchronizer 128 to generate one of two tones via lead 132 to the amplifier 120 in order to transmit digital synchronization information to the remote station.

The output of the band-pass filter 78 is connected via a lead 136 to the frequency shift key (FSK) demodulator 138. The demodulator 138 comprises a phase locked loop which locks onto the tone passed through the band-pass filter 78 and determines whether or not it is approximately 1740 Hz which represents a logical zero, or a 1959 Hz which denotes a logical one. The demodulator then generates digital signals via lead 140 to the digital correlator 142. The correlator 142 determines whether or not the digital signals generated by the demodulator 138 comprise a predetermined pattern to determine whether or not a valid signal has been received. If the predetermined pattern is recognized by the correlator 142, the correlator loads the prime sequence into a register in the controller synchronizer 128. A comparison of the transmitted prime sequence is made in the controller synchronizer 128 with the output of the random code generator 126. In a manner to be subsequently described in greater detail, the code generator 126 is then synchronized with the transmitted prime sequence in order to synchronize the transmitting and receiving stations. The controller synchronizer 128 also controls a muting circuit 146 in order to selectively mute undesirable voice transmissions on the communication line 50.

Detailed operation of the voice scrambler unit shown in FIG. 2 will initially be described in the transmitting mode, wherein scrambled voice signals are to be transmitted to a remote station. The Push-To-Talk switch on the handset 18 (FIG. 1) is depressed and the switch 46 contacts terminal 44 and the switch 60 contacts terminal 58. The switch 26 (FIG. 1) is placed in the Private mode so that switch 52 is in contact with terminal 54 and switch 68 is in contact with terminal 72. Depression of the Push-To-Talk button calls up a prime sequence from the code generator 126. However, prior to the transmission of the prime signal, the controller synchronizer 128 generates a standard pattern which is transmitted through the FSK modulator 130. Modulator 130 generates a sequence of two tones representative of digital zeros and digital ones through the amplifier 120 and to the communication line 50 for transmission to the remote station. In the preferred embodiment, the standard pattern comprises 32 bits of information broken down as follows:

- Bits 1–11 are all zeros in order to precondition the detection circuitry.
- Bits 12–18 are a seven bit pattern 1110010.
- Bits 19–25 are a repeat of bit pattern 1110010.
- Bits 26–32 are an inverted pattern 0001101.
- Each bit in the standard pattern is approximately 8 milliseconds in duration.

At the receiving end of the communication line 50, the FSK data is continually monitored and is sampled at eight times the bit rate (1 KHz). The samples are accumulated at the remote station in a correlator register whose outputs drive a large summing network. If a predetermined percentage of the samples correlate with the correct pattern noted above, a detection of the standard pattern is noted by the correlator. A carrier is thus assumed to be present and the remote station is ready to receive the prime data. If the pattern does not correlate as noted above, the correlator circuitry at the remote station returns to the search state.

After transmission of the standard pattern by the transmitting station, the prime data is called from the code generator 126 and is applied through the controller synchronizer 128 to the FSK modulator 130 for transmission to the communication line 50. As described in detail in the previously described copending patent application, the random code generator 126 normally operates in a circulating mode. When the Push-To-Talk button is depressed, the random code generator 126 is rapidly stepped ahead six permutations. The output of certain of the registers within the code generator 126 are then applied as 24 random bits of prime data to the controller synchronizer 128. The prime data is then applied through the FSK modulator 130 and applied to the communication line 50 for transmission to the remote station. Transmission of the standard pattern and the prime data in the preferred embodiment takes approximately 400 milliseconds.

At the remote station, the prime data, which in the preferred embodiment comprises 24 bits, is received and compared with the output of the code generator at the remote station. In the case of a relatively short transmission link between the two voice scrambling units, the code generator at the remote station will at this time be approximately six permutations behind the code generator 126 at the transmitting station and thus the prime data will not compare with the output of the remote code generator. However, in the case of a relatively long transmission link, such as a communication satellite, the code generator at the remote station will be less than six permutations behind the code generator 126 at the transmitting station. As will be subsequently shown, the present technique of rapidly stepping ahead the code generator 126 upon transmission enables automatic compensation for transmission delay.

If the output of the code generator at the remote station does not match with the transmitted prime data, the code generator at the remote station is stepped ahead one state and is again compared with the transmitted prime data. If a match occurs, with the possible error or two or fewer bits, the code generator at the remote station is deemed to be in synchronization, and the output of the remote code generator is utilized to control the heterodyning of the signals at the remote unit in order to unscramble the voice signals being received. However, if no match occurs at this point, the code generator at the remote station is again advanced one permutation and again compared. This comparison and advancement of the random code generator continues until either a match is found or until the code generator at the remote station has been advanced eight times. If a match is not found after eight advancements of the remote code generator, the priming data received from the transmitting station is loaded into the remote code generator in order to force the remote unit into synchronism with the transmitting unit. This technique of synchronization is advantageous in that transmission delays are automatically compensated for, and the synchronization technique is tolerant of up to two bit errors in order to prevent noise from effecting the synchronization of the two systems.

After the transmitting and receiving voice scrambling units are synchronized, voice data may be transmitted through the microphone 40 and the amplifier 42 into the five band-pass filters 76–84. The voice data is broken up into five frequency sub-bands and are beat up to the IF frequency at the balanced mixers 86–94. As noted above, the clock and tone generator 96 generates five heterodyning frequencies F1–F5 for application to be balanced mixers 86–94. The mixed signals are then applied through IF filters 98–106 in order to strip off the unwanted lower side bands and the high side-band signals are then heterodyned at the balanced mixers 108–116 in order to randomly rearrange and invert the frequency sub-bands.

This scrambling of the frequency sub-bands is accomplished by the permutation selector 117 under the control of the random code generator 126. The random code generator 126 generates a randomized sequence of nine-bit digital words. The random digital words are utilized by the permutation selector 117 to randomly select groups of five tones out of a possibility of 10 tones for application to the mixers 108–116 as tones FA–FE. Nine new bits of randomized key are generated by the code generator 126 each quarter of a second, so that the frequencies FA–FE are changed by the permutation selector 117 each quarter of a second. This randomized change of the frequencies FA–FE continues as long as the Push-To-Talk button is depressed on the handset 18. The rearranged and inverted voice signals are than applied through the low pass filter 118 and through the amplifier 120 for transmission via the communication line 50 to the remote station. The code generator at the remote station is now operating in synchronism with the transmitting code generator 126, and thus the permutation selector at the remote station generates frequencies FA–FE which operate to reorder the voice signals in their original order and to reinvert the inverted frequency sub-bands so that the original voice signals may be heard by the operator at the remote station.

Each of the nine-bit random digital words generated by the random code generator 126 is applied to the permutation selector 117 for control of the frequencies FA–FE. The first four bits of each of the randomized digital words are utilized to control the rearrangement of the order of the five frequency sub-bands. The last five bits of each randomized key word generated from the code generator 126 are utilized to control the inversion of selected ones of the frequency sub-bands.

It will be seen that because four randomized bits are utilized to control the reordering of the frequency sub-bands, sixteen different permutations of the recording of the frequency sub-bands is possible. An important aspect of the present invention is the determination of sixteen optimum permutations of the rearrangement of the frequency sub-bands. It will be seen that there exists a large number of possible permutations of rearrangements of the order of the five frequency sub-bands.

However, certain of the possible rearrangement permutations are undesirable, such as those permutations wherein a frequency sub-band remains in its original position. In certain instances, allowing a frequency sub-band to remain in its original position enables a substantial amount of intelligible voice data to be transmitted, thus violating security of the system. Thus, the present technique first eliminates all possible arrangement permutations wherein a frequency sub-band remains in its original position. The remaining arrangement permutations are than grouped into a relatively large number of sets of 16 different arrangement permutations. Each of the permutations within each set are then cross-correlated with one another. In other words, each permutation within each set of 16 permutations is compared with the remaining 15 permutations to determine the number of identical frequency sub-band locations. The minimum cross-correlation possible in the present example is 120. The sets of sixteen permutations which provide the lowest cross-correlation are then chosen for further analysis.

Each permutation within each of the chosen subsets is examined and an articulation index is applied thereto. This articulation index is directly related to the intelligibility of voice data which is rearranged according to that permutation. The calculation of an articulation index which has been found to work well in practice is described in "Methods for the Calculation and Use of the Articulation Index," by Karl D. Kryter, *The Journal of the Acoustical Society of America* (November 1962), pp. 1689–1697, and in "Validation of the Articulation Index," by Karl D. Kryter, *The Journal of the Acoustical Society of America* (*November* 1962), pp. 1698–1702.

After applying an articulation index to each of the permutations in each of the sets of sixteen permutations having a low cross-correlation, the average articulation index of each of the permutation sets is determined. The permutation sets having the lowest articulation index may then be used in the permutation selector 117.

It has been found that with the use of the above-described technique, subsets of sixteen permutations may be provided which provide excellent voice security. An example of a subset of sixteen arrangement permutations derived from the above-described technique, for rearranging frequency sub-bands having an output order of 12345, wherein 1 corresponds to the lowest frequency sub-band, is as follows:

23514
24153
24531
25134
31452
31524
35421
35214
41253
43152
43521
45231
51423
53412
54213
54132

The 16 possible arrangement permutations noted above are randomly selected by the first four bits of each randomized key word generated from the random code generator 126. As this random selection of the possible sixteen permutations is accomplished every quarter of a second, a substantial amount of voice security is thus provided.

Additional voice security is provided by the fact that the last five bits of each randomized key word generated by the code generator 126 are utilized to control the inversion of ones of the rearranged frequency sub-bands. A digital "one" in the last five bits of the random key words requires that the designated frequency sub-band be inverted. A "zero" in the last five bits of random key words indicates that the respective frequency sub-band is not inverted. As the last five bits of each random key word generated by the code generator 126 are randomly selected, it will be seen that the inversion of the rearranged frequency sub-bands provides an substantial amount of security in voice transmission.

An example of the selection of frequency signals FA–FE according to the randomized process of the invention will now be described. Assume that a voice signal having a frequency range of 400–500 Hz is input via the lead 74 to the five band-pass filters 76–84. The signals would be passed the the "fifth band-pass position" filter 84 and are applied to the balanced mixer 94 wherein the signals are heterodyned with the frequency F5 of 5886 Hz. The sum of the input frequencies with the frequency F5 results in a frequency board of 6286–6386 Hz being transmitted through the IF filter 106. The difference side band generated by the heterodyning is stripped off by the filter 106. The frequency band of 6286–6386 Hz is then applied to the balanced mixer 116, wherein the frequency band is best with a frequency signal FE. As previously noted, FE at any point in time could be one of ten possible frequencies.

In this example, it will be assumed that it is desired to rearrange the present voice frequency sub-band from the fifth band-pass position to the third band-pass position. To accomplish this, a frequency FE of 5014 Hz is utilized. The difference between the frequencies 6286–6386 Hz results in the frequencies of 1272–1372 Hz being output from the mixer 116 and passed through the low pass filter 118. It will be seen that the original input frequencies of 400–500 Hz which appeared in the fifth band-pass position have now been rearranged into the third band-pass position.

It will now be assumed that in addition to reordering the input frequency signal of 400–500 cps into the third band-pass position, it is also desirable to invert this frequency signal. The signal FE applied to the mixer 116 in this case would be 7848 Hz. It will be seen that the 400 Hz signal is now transformed into 1562 Hz, while the 500 Hz signal is transformed into 1462 Hz. Thus, the input frequency range has been reordered into the third band-pass position and inverted. In both of the above-described cases, the encoded frequencies would be transmitted through the amplifier 120 and through the communication line 50 to the remote station. The remote station, operating in synchronism with the transmitting station, would generate a frequency signal FC which would reorder the signal back into its original frequency band-pass position and would also reinvert the signal if required.

With the present technique of reordering and inverting five frequency sub-bands with a nine-bit randomized digital signal, 512 different encoded possibilities exist for the five frequency sub-bands at any instant in time. Due to the fact that the particular possible permutations have been carefully chosen to provide only the most unintelligible reorganizations of the voice signal, the present system provides extremely secure voice scrambling.

Figure 3:
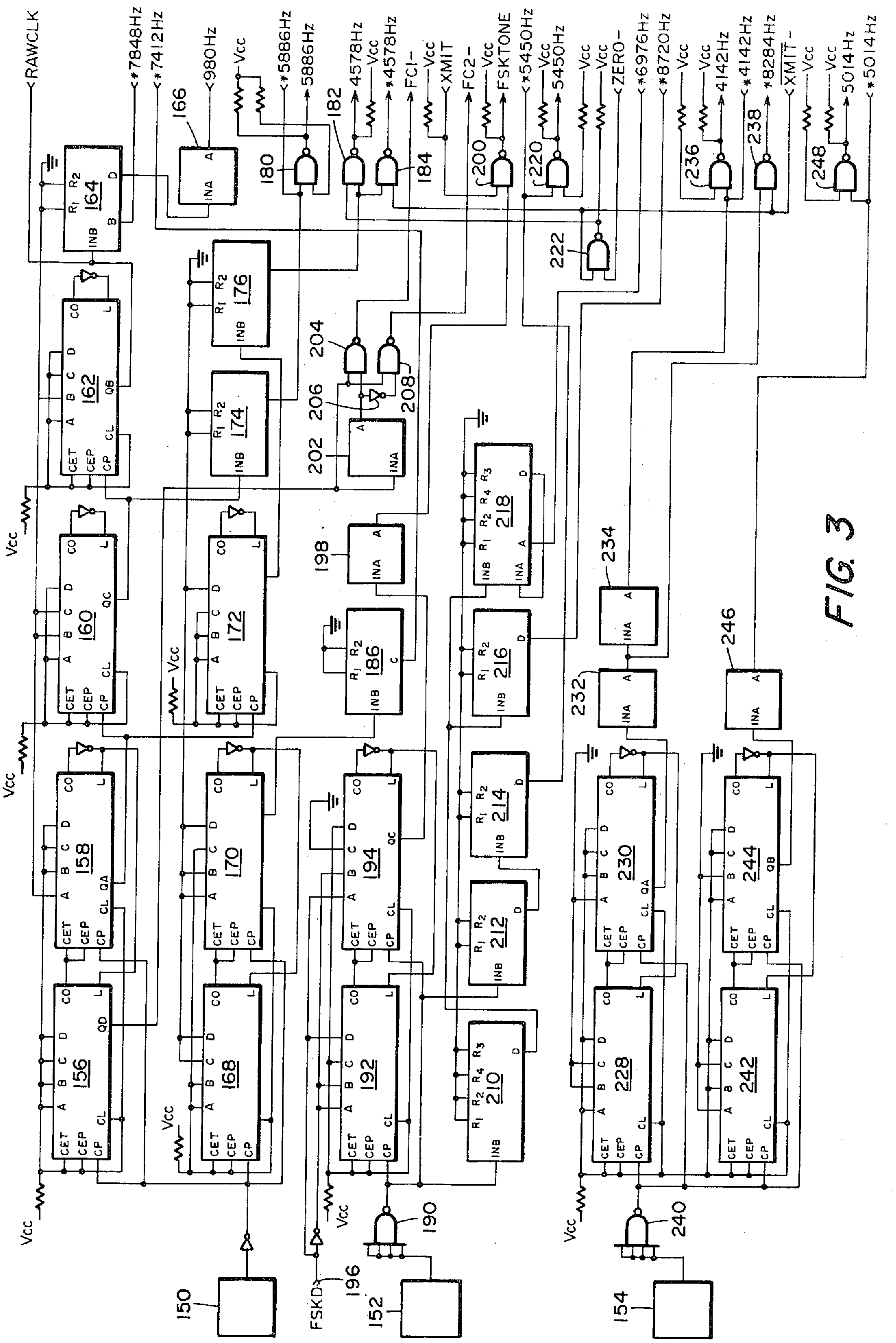
FIG. 3 is a schematic diagram of the clock and tone generator system of the invention.

FIG. 3 illustrates in schematic detail the clock and tone generator circuit 96. A temperature-compensated oscillator 150 includes a crystal-associated transistor to generate a stable output frequency of 5.603 MHz. A second oscillator 152 generates an output frequency of 348.8 KHz and a third oscillator 154 generates a 381.064 KHz signal. The present system divides down the outputs of the three oscillators 150–154 to provide clock signals and 10 tones which are utilized in the heterodyning technique of the system. The use of three oscillators rather than ten separate oscillators eliminates a substantial amount of expense in the construction of the system. An important aspect of the invention is the common use of divider circuits in order to eliminate circuitry. This technique envisions the use of the lowest common multiples between ones of the desired output signals in order to enable the common use of ones of the divider circuits.

The output of oscillator 150 is applied to a string of series connected synchronous binaryy counters 156, 158, 160 and 162. An asynchronous or ripple binary counter 164 is connected to counter 162 to generate a raw clock signal (RAWCLK) and an output frequency signal of 7848 Hz. The binary counters 156–162 in the preferred embodiment comprise SN7461 counters. Counters 156 and 158 operate to divide the output signal of oscillator 150 by seventeen. Counter 160 divides the resulting signal by seven, while counter 162 divides the resulting signal by three to generate an output signal of 15696 Hz which is applied to the ripple binary counter 164. The D output terminal of counter 164 provides a division by eight and is applied to a divide-by-two counter 166 which generates a 980 Hz warning signal. The B terminal of counter 164 generates a signal divided by two to provide the 7848 Hz signal. Counter 164 may comprise an SN7493 asynchronous binary counter. Counter 166 may comprise an SN7493 counter.

The output of oscillator 150 is also connected to a plurality of series connected synchronous binary counters 168, 170 and 172. Asynchronous binary counters 174 and 176 are connected in series with counters 168–172. Counters 168–172 may comprise SN74161 counters, while counters 174 and 176 comprise SN7493 asynchronous or ripple binary counters. Counters 168 and 170 operate to divide the output of oscillator 150 by 189. Counter 172 divides the output of counter 170 by nine, while each of the counters 174 and 176 provide a division by eight. The output of counter 160 is 47088 Hz which is applied to counter 174. Counter 174 generates an output of 5886 Hz.

In FIG. 3, the output frequencies designated by an asterisk comprise the ten tones which may be selected by the permutation selector 117 as tones FA–FE as previously described in FIG. 2. The output of counter 174 is applied through a NAND gate 180 to generate a 5886 Hz signal for use as a heterodyne tone in the first mixer 94. The output of counter 176 is applied through a NAND gate 182 to generate a 4578 Hz signal, and the same signal is applied through a NAND gate 184 to generate a 4578 Hz signal as one of the tones applied through the permutation selector 117. The output of counter 170 is a 29648 Hz signal which is applied to a ripple counter 186 which divides the signal by four to generate the 7412 Hz signal.

The output of oscillator 152 is applied through a four-input NAND gate 190 to a pair of series connected SN74161 synchronous binary counters 192 and 194. Counters 192 and 194 comprise the FSK modulator 130 shown in FIG. 2. Counters 192 and 194 operate to divide the output of oscillator 152 by either 89 or by 100, depending upon the logic level of the FSKD signal applied at terminal 196. The output of counter 194 is applied through an SN7493 asynchronous binary counter 198 which generates either a 1740 Hz or 1959 Hz signal which is applied through a NAND gate 200 to provide FSK tone for application to the communication line 50 in order to enable the transmission of digital information via the communication line. The counter 198 squares the outgoing FSK tones. An XMIT signal is applied to an input of the NAND gate 200 in order to gate the output FSK tone only during transmission of data. The output of counter 156 is also applied to the input of an SN7490 asynchronous decade counter 202. The output of counter 202 is applied through a NAND gate 204, an inverter 206 and NAND gate 208 to generate a fast clock signal one and a fast clock signal two (FC1 and FC2). These signals are applied as clock signals to the code generator.

The output of oscillator 152 is also applied to an asynchronous decade counter 210 connected in series with synchronous binary counters 212, 214 and 216 and asynchronous decade counter 218. An output from counter 214 provides a 5450 Hz signal and the output is applied through a NAND gate 220 to provide a 5450 Hz signal used for heterodyning purposes. A zero gating signal and an $\overline{\text{XMIT}}$ signal is applied to the input of a NAND gate 222 in order to gate NAND gates 182 and 184. An output of counter 218 provides a 6976 Hz signal and an output of counter 216 provides an 8720 Hz signal for application to the permutation selector 117 (FIG. 1).

The output of oscillator 154 is applied to synchronous binary counters 228 and 230 which operate to divide the signal by 23. The divided signal of 16568 Hz is applied through two divide-by-two ripple counters 232 and 234. The output of counter 234 generates a 4142 Hz signal for application to the permutation selector 117 and is applied through a NAND gate 236 to generate a 4142 Hz signal for heterodyning purposes. The output of counter 232 is applied through a NAND gate 238 to generate an 8284 Hz signal for application to the permutation selector 117. Gate 238 is gated by the $\overline{\text{XMIT}}$ signal.

The output of oscillator 154 is also applied through a four-input NAND gate 240 to synchronous binary counters 242 and 244 connected to divide a signal by 38. The resulting 10028 Hz signal is applied through a ripple counter 246 to generate a 5014 Hz signal for application to the permutation selector 117. The signal is also applied through a NAND gate 248 to generate a 5014 Hz signal for heterodyning purposes.

Figure 4:
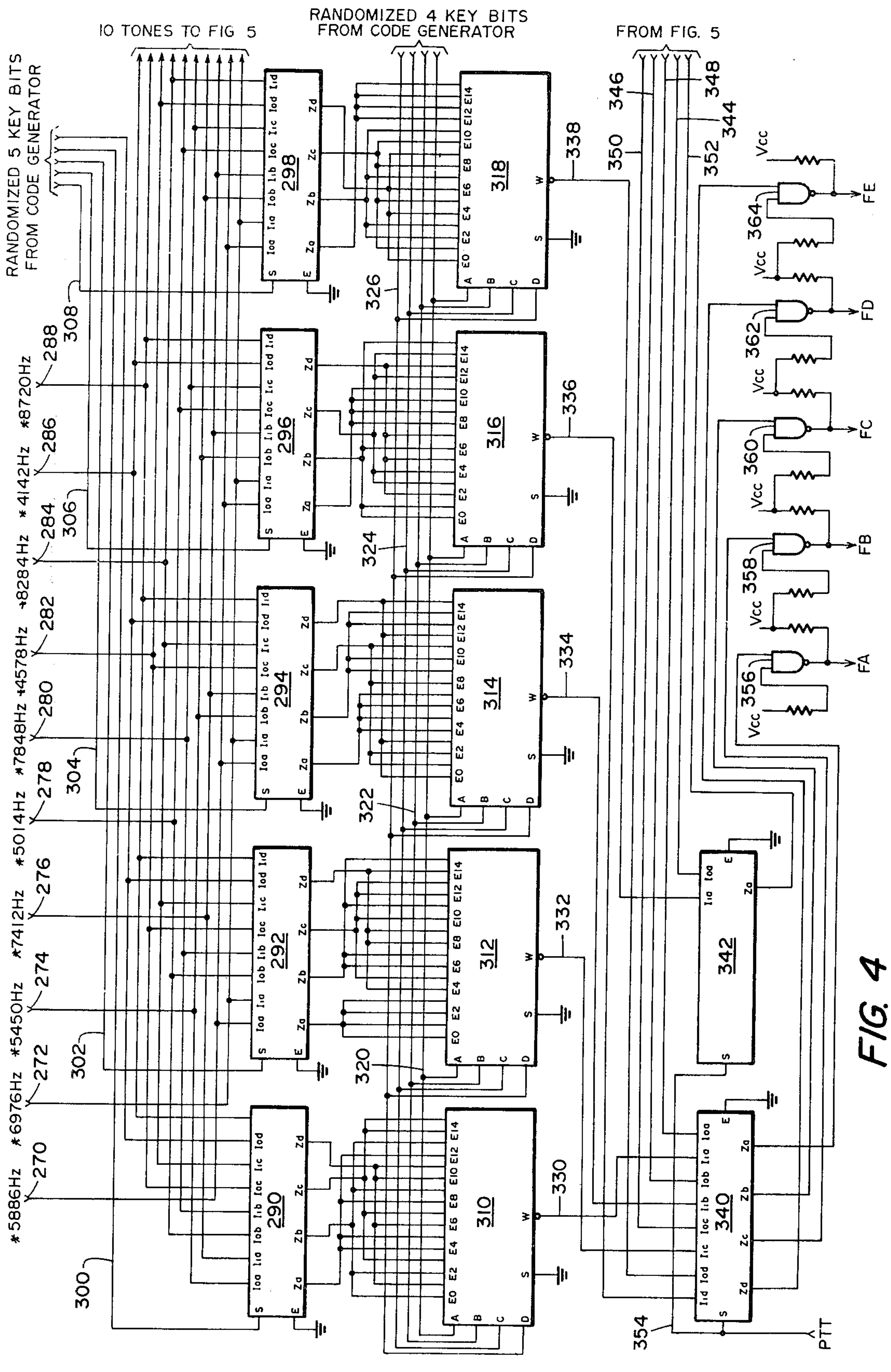
FIGS. 4 and 5 are schematic diagrams of the permutation selection circuitry of the invention.
Figure 5:
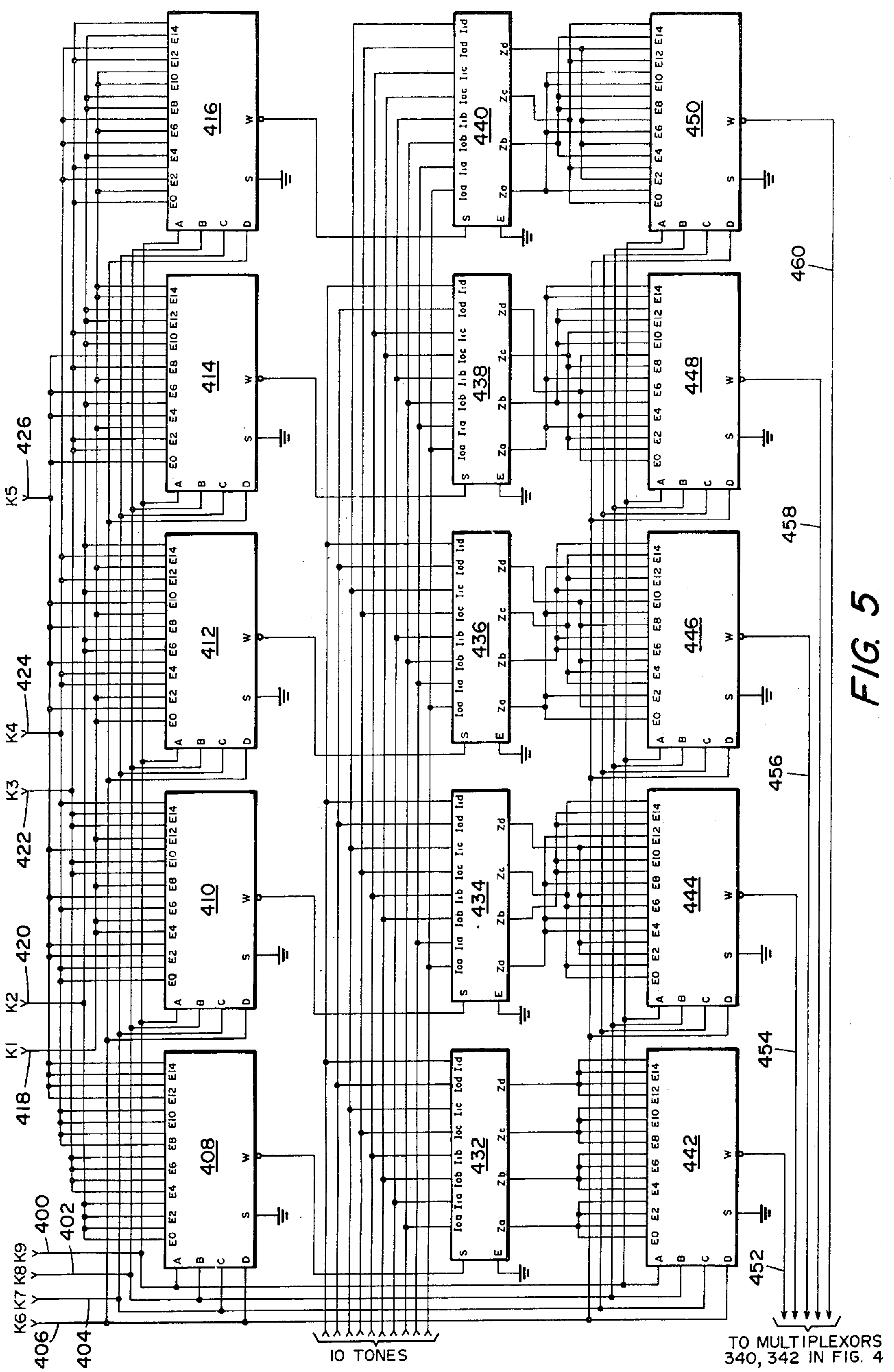

FIGS. 4 and 5 illustrate in schematic detail the permutation selector 117 previously described in FIG. 2. FIG. 4 illustrates the circuitry utilized in transmitting scrambled voice data. FIG. 5 illustrates the permutation selection circuitry used to decode scrambled data when the system is in the receive mode. Referring to FIG. 4, the 10 tones generated from the tone generator 96 are applied on terminals 270–288. The ten tones are interconnected in a preselected manner to the inputs of quad two-input multiplexers 290, 292, 294, 296 and 298. Suitable multiplexers for use in this circuit are the SN74157 multiplexers. The last five bits of each randomized digital word generated by the code generator 126 (FIG. 2) are applied via leads 300, 302, 304, 306 and 308 to control the selection of the tones applied to the multiplexers 290–298.

An important aspect of the invention is that, although there exist ten possible tones, each of multiplexers 290–298 only have eight inputs, as inputs to the multiplexers are eliminated which would place one frequency sub-band back into its identical position during rearrangement. As noted above, such a rearrangement would allow intelligible information to be passed and is thus undesirable. Each multiplexer 290–298 thus has eight tones applied thereto. The randomized key bit applied to the respective input of each multiplexer via the leads 300–308 determines which four of the eight tones are to be passed by the multiplexers. As will be recognized, four of the tones would provide inversion of the frequency sub-band, with the other four tones not providing inversion. Depending upon whether a logical "one" or logical "zero" is applied to the input of the multiplexers 290–298, the four tones output by each of the multiplexers provide either inversion or noninversion of the frequency sub-band.

The four tones output from each of the multiplexers 290–298 are respectively applied to 16-input multiplexers 310, 312, 314, 316 and 318. In the preferred embodiment, the multiplexers 310–318 comprise SN74150 multiplexers, each of which is essentially a single pole, 16 throw switch. The remaining four key bits of each randomized digital word generated by the code generator 126 are applied to the circuit of FIG. 4 via leads 320, 322, 324 and 326. These four randomized key bits are applied to control each of the multiplexers 310–318. The multiplexers 310–318 are interconnected with the outputs of the multiplexers 290–298 according to the subset of sixteen permutations selected by the previously described technique. As previously noted, these 16 permutations are specifically selected to provide the most unintelligible of the possible permutation arrangements.

The particular permutation to be output from each of the multiplexers 310–318 is addressed by the four key bits appearing on leads 320–326. The selected output from the multiplexers 310–318 are applied via leads 330, 332, 334, 336 and 338 to multiplexers 340 and 342. Multiplexers 340 and 342 comprise essentially five pole, double throw switches which are operated to select either the five tones coming from multiplexers 310–318 or the five tones coming from the multiplexers shown in FIG. 5, to be subsequently described. The five tones coming from the multiplexers in FIG. 5 appear on leads 344–352.

The selection of five tones by the multiplexers 340 and 342 are controlled by the Push-To-Talk (PTT) signal appearing on lead 354. The PTT signal is generated upon depression of the Push-To-Talk button on the handset 18 shown in FIG. 1. When the PTT signal is a logic "one" which indicates that the Push-To-Talk button is depressed, the tones appearing from multiplexers 310–318 are transmitted through the NAND gates 356, 358, 360, 362 and 364 to appear as tone signals FA–FE. As described in FIG. 2, tones FA–FE are applied to mixers 108–116 in order to heterodyne the IF signals to randomly vary the arrangement of the frequency sub-bands and to selectively vary the inversion of the frequency sub-bands. FIG. 5 illustrates the circuitry of the permutation selector 117 which is utilized to decode scrambled voice data when the system is a receive mode. The first four randomized key bits from the code generator 126 are applied on leads 400, 402, 404, and 406 and are applied to control the operation of sixteen-input multiplexers 408, 410, 412, 414 and 416. In the preferred embodiment, the multiplexers 408–416 comprise SN74150 multiplexers. The last five digital bits of each randomized digital word supplied by the code generator 126 are applied to terminals 418, 420, 422, 424 and 426. The ten tones generated from the tone generator 96 are applied to the 10 leads indicated by bracket 430 and interconnected into the inputs of quad two-input multiplexers 432, 434, 436, 438 and 440. The four outputs of each of the multiplexers 432–440 are respectively connected to the inputs of 16-input multiplexers 442, 444, 446, 448 and 450. The outputs of multiplexers 442–450 are applied via leads 452–460 to the switching multiplexers 340 and 342 previously described in FIG. 4.

The operation of FIG. 5 will now be described. It is important to note that the code generator of the receiving unit is synchronized with the code generator of the transmitting unit and thus the identical randomized key bits are being generated by the code generators at both the transmitting and receiving stations. The purpose of multiplexers 408–416 is to rearrange the randomized key bits generated by the code generator 126 at the receiving station so that they control the proper tone pairs for accurate decoding.

The ten tones are applied through the multiplexers 432–440 and the selection of the correct four tones to provide proper inversion is controlled by the output signal generated by the multiplexers 408–416 and applied to the strobe (S) terminal of the multiplexers 432–440. The selected four tones are then applied to the multiplexers 442–450. The input wiring to the multiplexers 442–450 is selected in accordance with the subset of sixteen optimum permutations which were wired into the multiplexers 310–318 in FIG. 4. This wiring is thus opposite to the wiring shown in FIG. 4. The output from the multiplexers 442–450 is controlled by the randomized key bits appearing on leads 400–406 which address the desired tone in an opposite manner as was done at the transmitting station, and thus selected tones are applied on leads 452–460. The selected tones are switched by the multiplexers 340 and 342 (FIG. 4) to generate five tones FA–FE which will rearrange and reinvert the frequency sub-bands in order to provide a clear voice signal.

Figure 6:
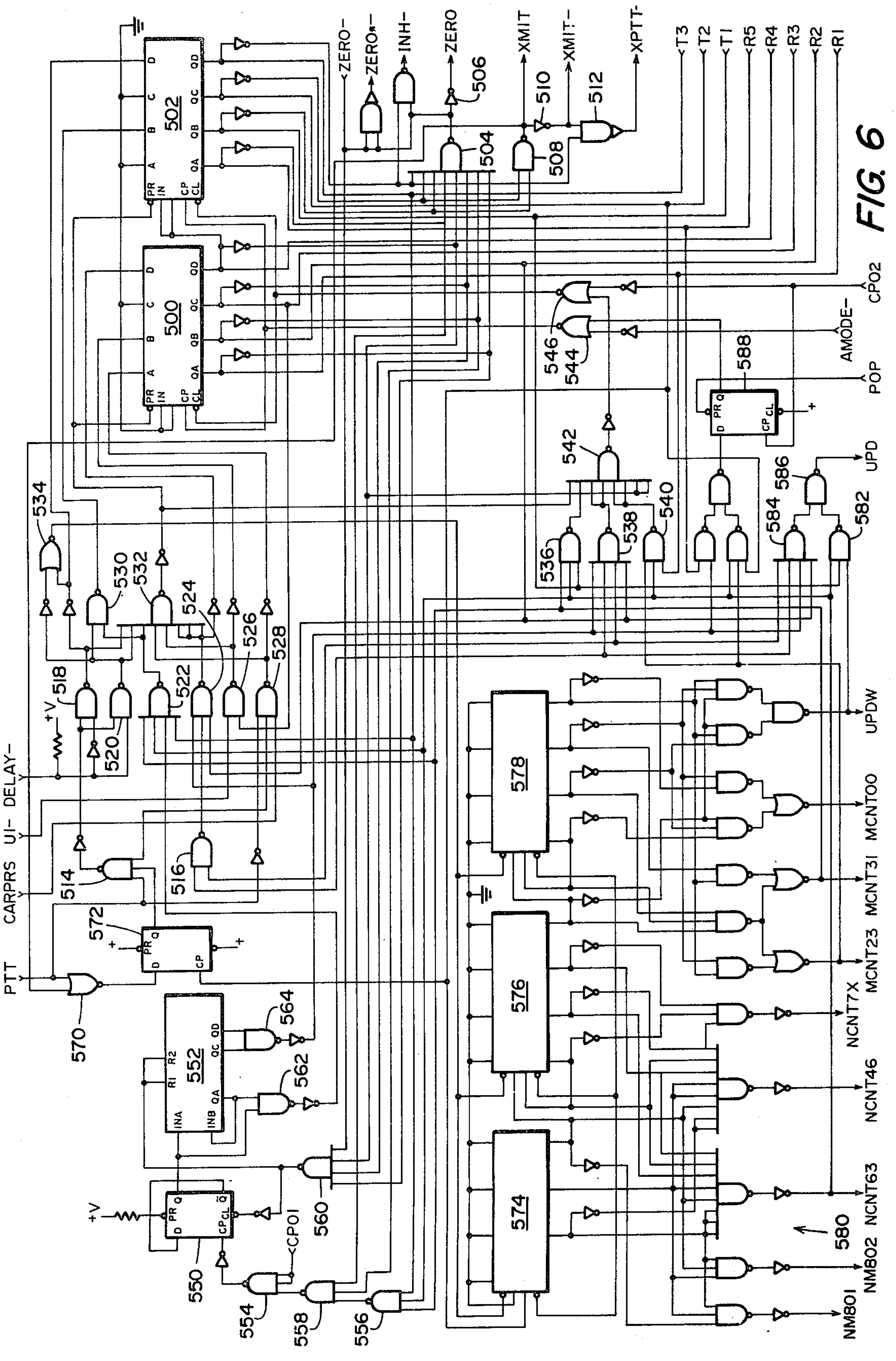
FIGS. 6 and 7 are schematic diagrams of the controller synchronizer of the invention.
Figure 7:
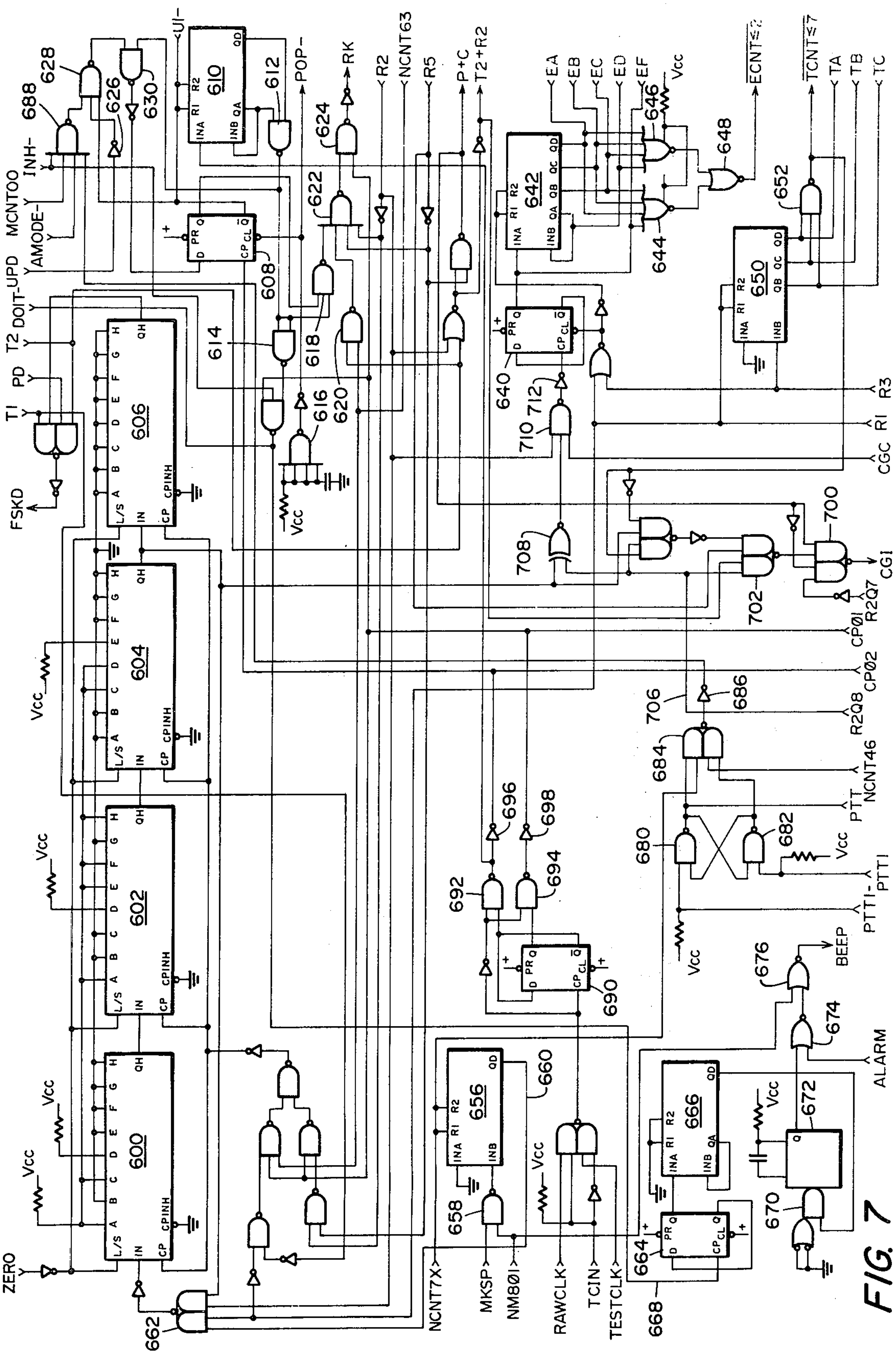

FIGS. 6 and 7 illustrate in schematic detail the controller synchronizer 128. Referring to FIG. 6, shift registers 500 and 502 are interconnected to comprise the main controller to determine which state the present machine is in. The outputs of the registers are denoted as receive states R1–R5 and transmit states T1–T3. The ninth state of the system is decoded by gate 504 to generate the ZERO signal through an inverter 506. The ZERO signal indicates the absence of a receive or transmit state which occurs when the voice scrambler is simply idling or normally encoding or decoding a message. States T1 and T2 are decoded at gate 508 to generate the XMIT signal to denote when the system is transmitting data. The XMIT is inverted by an inverter 510 to generate the $\overline{\text{XMIT}}$ which is applied through the gate 512, along with the inverted T3 signal, to generate the signal $\overline{\text{XPTT}}$.

The steering logic for the master control of the circuit comprises primarily NAND gates 514, 516, 518–28, 530 and 532 and a NOR gate 534. The necessary logic conditions required to transition the present system between states is decoded by gates 514–534, and the resulting signal is applied to parallel inputs of the master controller comprising the registers 500 and 502. Clocking of the master controller registers 500 and 502 is accomplished through NAND gates 536–540, 542 and NOR gates 544 and 546.

A circuit known as the X counter includes a flipflop 550 and a binary counter 552. The X counter is utilized for general timing, such as the delay utilized in going into a state and in keeping track of how many prime bits have been received by the system. Clocking signals are applied to the flipflop 550 through a NAND gate 554 and through NAND gates 556 and 558. The counter 552 is controlled by a four-input NAND gate 560 and outputs of the counter 552 are applied through NAND gates 562 and 564 to the steering logic for the master control. The Push-To-Talk (PTT) signal is applied through a NOR gate 570 to a flipflop 572, an output of which is applied to the steering logic and an output of which is also applied to the N and M counters comprised of SN74197N counters 574, 576 and 578. Counters 574–578 keep track of the stage of a permutation. For example, counters 574 and 576 comprise the N counter and generate outputs which are applied through gates 580 to provide NM801, NM802, NCNT63, NCNT46, and NCNT7X. These signals indicate the bit timing and subdivision within a bit. The M counter including register 578 generates MCNT23, MCNT31, MCNT00 and UPDW to denote the bits within a permutation. For example, considering a permutation 32 bits long, the signal MCNT00 denotes the first bit of the permutation and MCNT31 denotes the last bit.

To explain in greater detail the operation of counters 574–578, at the beginning of a permutation, the counters 574–578 are reset to all zeros. The N counter then starts counting from zero up to 63. This subdivides each bit into 64 increments 00 through 63. This signal NCTNT63 denotes the trailing edge of the last bit. The NCNT7X denotes the leading edge of the first bit. The NCNT46 bit is utilized for timing and denotes a point approximately two-thirds of the way through a bit. Once the N counter has reached the count 63, the counter causes the M counter to increment by one and the N counter resets and begins counting subsegments of a bit again. Once 32 bits have been encountered which constitute an entire frame, the whole M and N counter is reset and the counting is begun again.

The signal UPDW is an update window signal to indicate the appropriate time for which the code generator should be updated. The UPDW signal is further controlled by outputs from the master controller through NAND gates 582, 584 and 586 to generate the signal UPD which causes the code generator to update. The flipflop 588 maintains a clear on the master controller for a period of one clock in order to eliminate any race conditions.

The POP signal tied to the flipflop 588 indicates the power on preset and is an input from the power on logic and ensures that the controller starts off in a cleared condition. The AMODE signal is a signal which denotes that the system is in a fixed band scrambler mode and thus locks the controller in state zero. The CP02 is the second phase of the controller clock signal.

The signal R1 denotes the receive state 1 which is the state in which prime information is being received and loaded into a holding register. The receive signal R2 is the part of the cycle which serves to compare the prime data just received with what is in the code generator. Receive state R3 denotes that the code generator is being advanced. Receive state R4 is an idle state. The receive state R5 denotes the receive state in which the received prime is either loaded into the code generator or the code generator is allowed to proceed with its own internal random code.

The transmit signal T1 is the state in which the fixed pattern is initially being transmitted during the transmission mode. The transmit state T2 is the state in which the prime from the code generator is being transmitted. The transmit state T3 is an additional delay state which is encountered if the delay signal applied to gates 518 and 520 is a binary "zero." This signal is primarily used in portable transmitters that have to have a warm-up time after each Push-To-Talk operation. This provides approximately two-thirds of a second delay before any data is actually transmitted. The operator of the system has an option to utilize this delay by grounding the pin to which the delay prime bar signal is applied.

The signal XPTT denotes that the Push-To-Talk switch is open and is closed to hold in the transmitter relay during the time that the data is being transmitted. The $\overline{INH}$ signal is an inhibit signal utilized while the machine is either transmitting or receiving so that the code generator cannot take additional steps during the time. The signal carrier present (CARPRS) denotes that the standard characters have been transmitted and received, the prime has been transmitted and received, and the carrier signal has been established.

FIG. 7 illustrates the remainder of the controller synchronizer circuit 128 previously described in FIG. 2. Registers 660, 602, 604 and 606 are interconnected to form a 32-stage shift register. This register is utilized as a holding register for the incoming prime data received during state RI. This register is also present to contain a correlation pattern previously described and is utilized to transmit this pattern during state TI. A U counter circuit comprises a flipflop 608 and a counter 610. This is a nine-bit counter which operates such that each time the code generator is instructed to update, the counter allows nine update signals termed RK to be generated through NAND gates 612–624. Each RK signal causes the code generator to generate one bit key. Hence, upon each update represented by the signal UPD applied through inverter 626 and gates 628 and 630, the flipflop 608 counter 610 generate nine RK signals.

The controller circuitry further includes an E counter including a flipflop 640 and a counter 642 which is used to count the errors between the received prime data and prime data contained within the code generator. The flipflop 640 and counter 642 thus determine whether or not the received prime data compares within two bits with the prime data stored in the code generator 126. The decoding of a count less than two is performed by the gates 644, 646 and 648 to generate the $\overline{ECNT \leq 2}$ which indicates with a logical "zero" that less than two errors have occurred. Upon receipt of this signal, the circuit proceeds with a voice scrambling operation.

A counter 650 comprises a T counter or trial counter which keeps track of how many comparisons which have been made in the receive cycle. The code generator 126 is continuously advanced or updated one permutation and compared with the prime data in the receive mode until a match has occurred, or until the T counter 650 has counted eight such comparison attempts. The output from the counter 650 is decoded by the gate 652 and a signal $\overline{TCNT \leq 7}$ is generated when eight updates have occurred. As previously noted, when eight update attempts have occurred, the received prime data is forced or loaded into the code generator to force the system into synchronization.

A counter 656 operates in conjunction with its associated circuitry to operate essentially as a digital integrator. The mark and space data generated from the correlator 142 FIG. 2) is input as signal MKSP to the input of a NAND gate 658 and is gated by a clock signal NM801 into the counter 656. The mark space data is sampled approximately eight times per bit. If at least four of the samples result in a sample logic "one", then the data bit is assumed to have been a logic "one". This provides an averaging technique to determine the data rather than utilizing a single sample, thereby providing much more reliable reception of data. The output of the averaging counter 656 is applied through lead 660 to an input of a gate 662 to the holding registers 600–606.

A flipflop 664 and a counter 666 are interconnected to receive an indication via lead 668 of the generation of each permutation by the random code generator 126. When the proper output is received from the code generator, a signal is applied from the counter 666 through an AND gate 670 and through a one-shot 672 and NOR gates 674 to generate a short alarm tone termed a Beep. This alarm tone is transmitted to the communication line so that the operators of the system will be aware that the system is functioning properly. During proper operation, the Beep appears each four seconds. In case the proper permutation input is not input into the counter 666, thereby indicating a malfunction in the code generator 126, an alarm signal at the input of the gate 674 is charged from a logic "zero" to a logic "one" to denote an alarm. Additionally, the output of gate 676 becomes a constant tone to indicate to the operator that a malfunction in the code generator has occurred.

NAND gates 680 and 682 comprise a simple latch which decouples and debounces the relay contact labeled $\overline{PTTI}$ and PTTI applied to the inputs of the gates 680 and 682. The output of the latch is a PTT signal and provides a clean debounce and isolated Push-To-Talk signal. The output of gates 680 and 682 are applied through NAND gates 684 and through an inverter 686 for application to a NAND gate 688. Gate 688 is further gated by the previously described signals $\overline{AMODE}$, MCNTOO and $\overline{INH}$.

The two phase control clocks termed CP01 and CP02 are generated by a flipflop 690 through NAND gates 692 and 694 and inverters 696 and 698. The gates 692 and 694 generate the two clocks CP01 and CP02 which are 25% duty cycle and 180° out of phase with one another.

Gates 700 and 702 are interconnected in order to select the information applied to the code generator 126. The signal CGI may either connect the code generator back to itself or may connect the code generator to the output of the shift register 604 in order to force or load the prime data into the code generator 126. As previously noted, the incoming prime data which is stored in registers 600–606 is compared by an exclusive OR gate 708 with the data already in the code generator 126 (FIG. 2), denoted by the signal R2Q8 appearing on lead 706. Whenever the two bits compared by the gate 708 are identical, the output of the gate 708 is logic "zero". This information is then applied through a NAND gate 710 and inverter 712 to the input of the error counter comprising flipflop 640 and counter 642.

An important aspect of the invention is that in case the code generator 126 ceases to step to new permutations, the voice output by the unit, when in a transmit private mode, will be scrambled in the single permutation. Under no circumstances will clear unscrambled voice data be transmitted. An important aspect of the invention is also that scrambled data may be transmitted in only a single selected permutation, rather than the randomly scrambled series of permutations provided by the code generator of the invention. This somewhat simpler mode of operation of the unit may be desirable to make the unit compatible with simple scrambling units which do not have the random code generator capability of the present unit, and is also useful for system testing and fault diagnosis.

Figure 8:
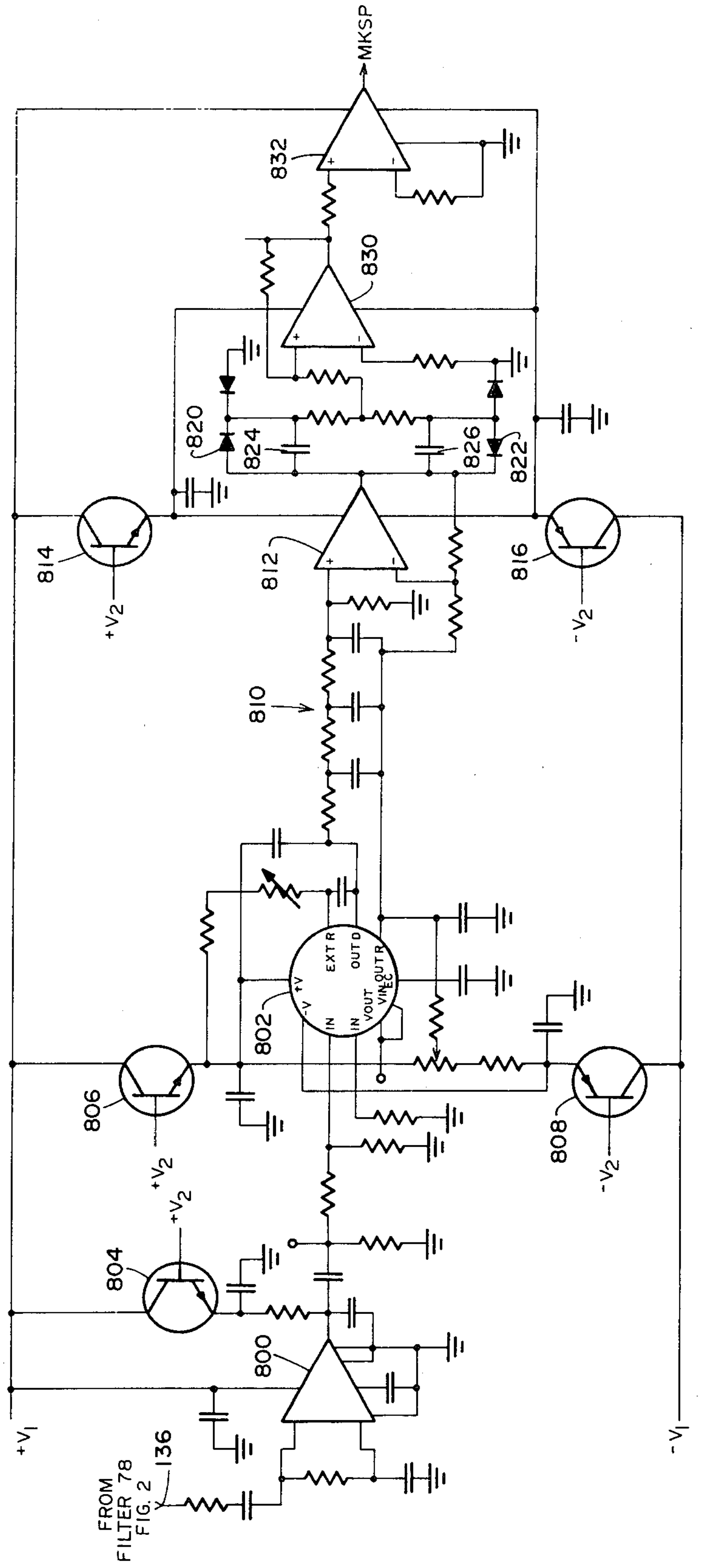
FIG. 8 is a schematic diagram of the demodulator of the invention.

FIG. 8 discloses in schematic detail the FSK demodulator 138 previously shown in block form in FIG. 2. The FSK demodulated data transmitted through filters 78 (FIG. 2) is applied via lead 136 (FIGS. 2 and 8) to the input of a limiter 800. Limiter 800 operates to square the signal by clipping off amplitude peaks, such that the remaining circuitry can operate only on frequency. The output of the limiter 800 is applied to the input of a phase lock loop 802. An emitter follower-connected transistor 804 is utilized to provide noise isolation to the circuit. The +V1 voltage is generally noisy due to audio signals and the like. The +V2 voltage is essentially noise-free, as it is derived from a voltage regulator using zener diodes to decouple from the noisy +V1 line. The transistor 804 thus provides essentially noise-free bias voltage for the operation of the demodulator circuit.

The phase lock loop 802 comprises an FE565K phase lock loop manufactured and sold by the Signetics Corporation. As is known, the phase lock loop includes a phase detector operated by a voltage control oscillator (VCO). The output of the phase detector is applied through a filter to an output, with the output of the filter also being applied to control the VCO. The phase detector determines the relative phase of the input signal and the output of the VCO. If these two signals are out of phase, an error voltage is generated by the phase detector which is applied through the low pass filter and to the VCO to force the VCO to vary its output to bring the two input singals in phase. Once the system is locked in phase, if the input frequency changes, the phase lock loop tends to follow to generate a DC level output porportional to the frequency variations of the input signal. Thus, the output of the phase lock loop 802 is a DC level output proportional to the frequency variations of the input applied through the limiter 800.

Essentially noise-free bias voltage is applied to the phase lock loop 802 from emitter follower-connected transistors 806 and 808 in the manner previously described. The output of phase lock loop 802 is applied through a ladder filter 810 for elimination of noise and is applied to the input of an operational amplifier 812 to bring the level of the signal up a higher peak to peak swing. Noise-free bias voltage is applied to the amplifier from emitter follower-connected transistors 814 and 816. The output of amplifier 812 is applied to a level translator comprising parallel-connected diodes 820 and 822 and capacitors 824 and 826.

The level translator allows bias to be accommodated in the FSK data. Thus, in case the frequency of the FSK signal is shifted in transmission over a single side-band system, the present system is able to accommodate any such frequency shift. The present level translator allows ±50 Hz translation error. The level-translated signal is then applied to the input of an operational amplifier 830 which switches output states based upon the input level applied thereto. The output of amplifier 830 is applied to a comparator 832 which operates upon the data to make the data compatible for TTL circuit operation. The output of the comparator 832 thus comprises the signal MKSP which provides a logic "one" for a mark and logic "zero" for space data.

Figure 9:
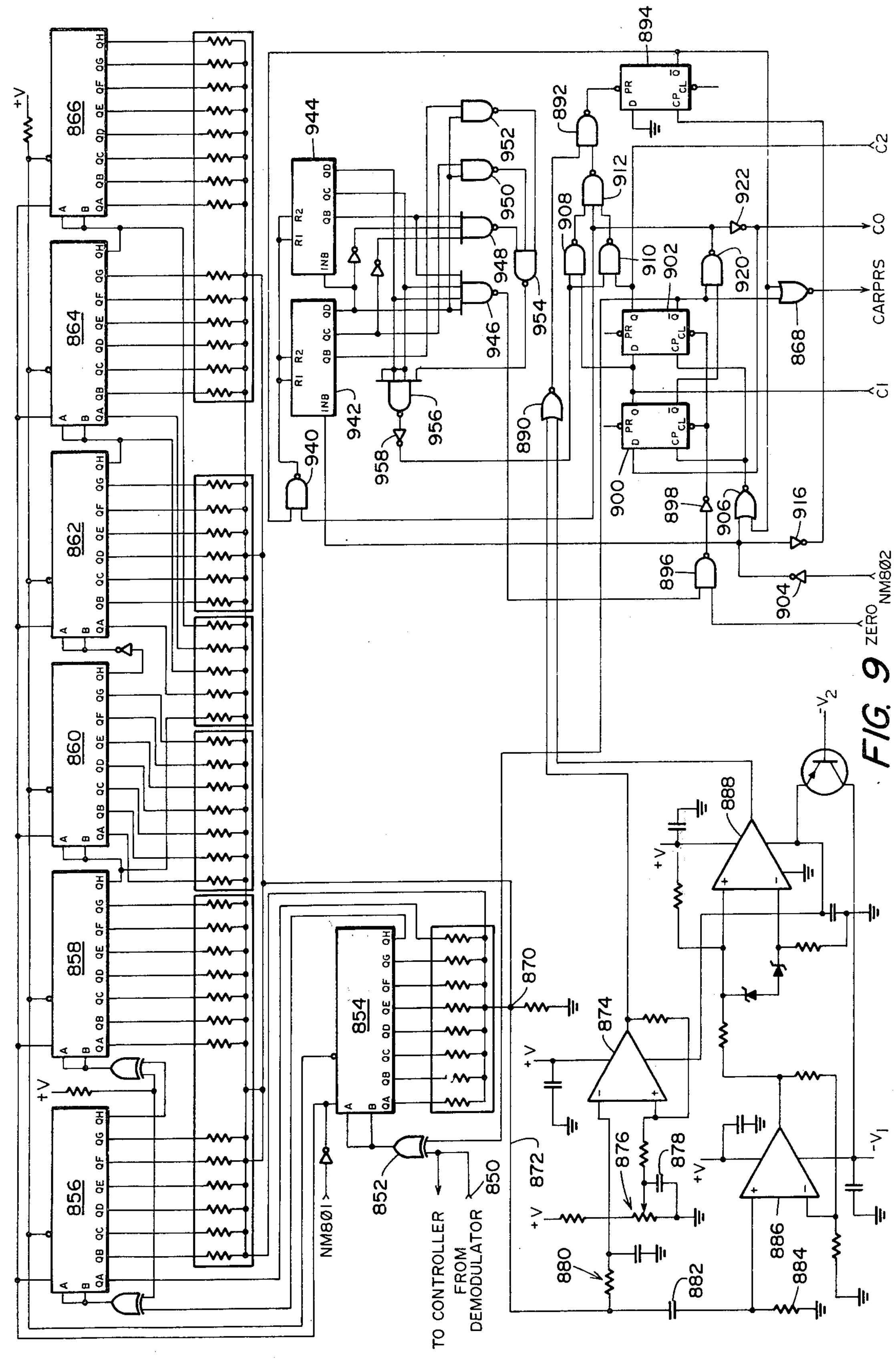
FIG. 9 is a schematic diagram of the digital correlator of the invention.

FIG. 9 illustrates in schematic detail the digital correlator 142 previously described in block form in FIG. 2. The digital correlator 142 receives the mark space signal MKSP from the demodulator via terminal 850. The MKSP data is applied through an exclusive OR gate 852 to eight-bit registers 854, 856, 858, 860, 862, 864 and 866. In the preferred embodiment, the registers 854-866 comprise SN74164N eight-bit registers. The gate 852 is controlled by a flipflop 902, and serves to invert the MKSP data when the controller enters its third state C2.

The MKSP data is clocked through the registers 854–866. Each mark or space is 8 milliseconds in duration, and the data is clocked every 1 millisecond. It thus takes eight clocks to clock in one mark or space. The outputs of each of the registers. 854–866 are tied to a summing node 870. The voltage appearing at the summing node 870 thus is sequentially stepped upwardly as the three fixed data patterns generated by a transmitting voice scrambler unit are received by the present system when in a receive mode. As previously noted, upon initial transmission of voice scrambled data with the present system, a pattern of 32 predetermined bits of information are transmitted as follows;

Bits 1–11 are all zeros used to precondition the detection circuitry.

Bits 12–18 are a seven bit pattern 1110010.

Bits 19–25 are a repeat of the bit pattern 1110010.

Bits 26–32 are inverted pattern 0001101.

Thus, summing node 870 provides a steadily building voltage peak as the first seven-bit pattern 1110010 is received by the registers 854–866. After the entire character has been received, the voltage appearing at the node 870 will sequentially be reduced in steps until the next full character is received, at which time a second voltage peak will be built up at the summing node 870. After recognization of this second peak, the correlator enters its third state and the exclusive OR gate 852 inverts the incoming MKSP data. The second peak will then be sequentially reduced and a third voltage peak will be built up at the summing node 870 as the third peak pattern is received. The voltage appearing at the summing node 870 is thus detected via lead 872 by a comparator 874. A threshold voltage is applied to the noninverting input of the comparator 874 through a resistive divider 876 and a decoupling capacitor 878. The voltage from the summinng node is applied through a low pass filter 880 prior to input to the comparator 874. The comparator 874 generates a low output signal each time the voltage appearing on the summing node 870 is above the threshold voltage.

The voltage at the summing node 870 is also applied through a differentiator circuit comprising a capacitor 882 and a resistor 884 and is applied to an amplifier 886. Due to the differentiator, the output of the amplifier 886 is a positive peak when the voltage at the summing node 870 takes a positive step upward and the output of the amplifier 886 is a negative peak when the voltage at the summing node 870 takes a negative step in amplitude. The output of the amplifier 886 is applied to a comparator 888 which detects only the negative spikes. A threshold voltage is applied to the inverting input of the comparator 888. If the negative spike is larger than the threshold voltage, the output of the comparator 888 goes negative. The output of the comparatorr 874 is applied to one input of a NOR gate 890 and the output of the comparator 888 is applied to the second input of the gate 890.

The output of gate 890 goes high only when negative input signals are applied from both comparators 874 and 888. Thus, a high output from gate 890 provides an extremely accurate indication that one of the three fixed characters has been received by the correlator. Specifically, an output appears from gate 890 on the first negative going edge of each voltage peak appearing at summing node 870. The present circuit is thus able to extremely accurately determine when the the three fixed pattern signals are received.

The output of gate 890 is applied through a NAND gate 892 which is connected to a flipflop 894. The zero signal which indicates when the system is not transmitting or receiving is applied to an input of a NAND gate 896. The output of the gate 896 is applied through an inverter 898 to flipflops 900 and 902. The signal NM802, previously described which indicates the status of a permutation through the register in the synchronized controller, is applied through an inverter 904 to a NOR gate 906. The output of the NOR gate 906 is also applied to the flipflops 900 and 902. Flipflop 902 is connected to inputs of NAND gates 908 and 910, the outputs of which are connected through a NAND gate 912 to an input of NAND gate 892. The NM802 signal is also applied through an inverter 916 to the flipflop 894. The Q output of flipflop 900 generates a signal C1 which indicates when the correlator has detected the first negative going edge of the first peak to indicate that the first predetermined word has been receivved. The $\overline{Q}$ terminal of flipflop 902 is applied through a NAND gate 920 and an inverter 922 to generate the signal CO which indicates the normal state of the correlator whenever random data is coming in. The Q output of flipflop 902 generates the signal C2 which indicates when the second predetermined word has been detected by the correlator. As previously noted, the output of gate 868 generates the CARPRS signal which indicates when all three predetermined words have been received by the correlator.

The output of gate 920 is applied to an input of a NAND gate 940, with the other input of the gate 940 being connected to the $\overline{Q}$ of the flipflop 894. Gate 940 is connected to counters 942 and 944. The output of the counters 942 and 944 are connected with NAND gates 946, 948, 950 and 952. The gates 946–952 are connected through a NAND gate 954 and a NAND gate 956 and through an inverter 958 to inputs of gates 908 and 910. Counters 942 and 944 operate to provide timing windows for detection of the last two incoming predetermined digital words to enhance the reliability of the correlation detection. The signal C2 can thus only be generated during a specified time window determined by the counters 942 and 944 following the time that the first peak was detected, and the signal CAPPRS may be generated only during a time window following the time that the second peak was detected.

When the three predetermined words have been detected by the digital correlator shown in FIG. 9, the mark space MKSP signal is applied to the synchronizer controller to enable the controller to look for the incoming prime signal. A previously described, when the prime signal is received by the controller, the prime signal is compared with the output of the code generator in order to provide synchronization as previously described.

It will thus be seen that the present invention provides a voice scrambling unit which provides continuous randomized reordering and inverting of frequency sub-bands of a voice signal to provide security of voice transmission. The voice signal is rescrambled each quarter of a second according to a randomized permutation specifically selected to provide only the most unintelligible encoding of the voice signal. With the use of the present synchronization technique, automatic compensation is provided for long distance communication. The present system is specifically constructed to be essentially maintenance free and to eliminate the possibility of transmission of clear voice data when in the private mode. In case of a malfunction, only coded data is sent. In case of a malfunction of the code generator, an alarm signal is indicated to the operators of the unit.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. In a system wherein a voice signal is split into a plurality of frequency sub-bands and the order of the frequency sub-bands is rearranged according to a randomized signal, a synchronization circuit comprising:

a cyclically operable sequential stepping circuit for generating said randomized signal;

means for rapidly advancing said stepping circuit a predetermined number of steps at a rate greater than the data rate prior to initial transmission of voice data in order to generate a randomized digital prime word at the end of said rapid advancement; and means for transmitting said prime word to a remote receiving station for comparison with a stored randomized digital word to provide synchronization between the stations, said rapid advancement of said stepping circuit enabling automatic compensation of the received prime word for transmission path delay and permitting error correction of the received prime word at the receiving station.

2. The synchronization circuit of claim 1 and further comprising:

means for transmitting a predetermined series of digital bits prior to transmission of said randomized prime word.

3. The synchronization circuit of claim 1 wherein said stepping circuit is rapidly advanced six steps prior to transmission of voice data in order to generate said prime word.

4. In a voice scrambler system including a first station wherein a voice is split into a plurality of frequency sub-bands and the order of the frequency sub-bands is randomly rearranged and transmitted to a second station for decoding, a synchronization system comprising:

cyclically operable sequential stepping circuits located at each said first and second stations for generating randomized digital signals;

means for rapidly advancing the stepping circuit at said first station a predetermined number of steps at a rate greater than the date rate prior to transmission of coded voice data to said second station, the output of said stepping circuit after said rapid advancement being a randomized digital prime word, said rapid advancement of said stepping circuit enabling automatic compensation for transmission path delay;

means for transmitting said prime word to said second station;

means at said second station for comparing said prime word with the output of the stepping circuit at said second station; and means for advancing the stepping circuit at said second station until the output thereof corresponds within a predetermined tolerance with said prime word or until a predetermined number of comparisons have been made.

5. The synchronization system of claim 4 wherein the stepping circuit at said first station is advanced six steps prior to transmission of coded voice data.

6. The synchronization system of claim 5 wherein the output of the stepping circuit at said second station is converted to said prime word after a predetermined number of comparisons have been made between said prime word and the output of the stepping circuit.

* * * * *

UNITED STATES PATENT OFFICE

CERTIFICATE OF CORRECTION

Patent No. 3,991,271 Dated November 9, 1976

Inventor(s) Kenneth M. Branscome, William M. Heath, George E. Goode, Kenneth W. Heizer and Barrie O. Morgan It is certified that error appears in the above-identified patent and that said Letters Patent are hereby corrected as shown below:

Col. 2, line 24, "random" should be --randomly--.
Col. 3, line 3, after "preselected" delete the period;
line 56, delete "combination" and insert --combinations--

Col. 5, line 21, "tons" should be --tones--;
line 58, "applield" should be --applied--.
Col. 8, line 60, "be balanced" should be --the balanced--.
Col. 9, line 13, "than" should be --then--;
line 35, "recording" should be --reordering--.
Col. 10, line 66, "provides an substantial" should be --provides a substantial--.
Col. 11, line 6, "passed the the" should be --passed by the--;
line 10, "frequency board" should be --frequency band--;
line 15, "best with" should be --beat with--.
Col. 12, line 6, "synchronous binaryy counters" should be --synchronous binary counters--.
Col. 14, line 53, "system is a" should be --system is in--.
Col. 16, line 10, "NM801, NM802," should be --NM8Ø1, NM8Ø2,--
line 24, "NCTNT63" should be --NCNT63--;
line 48, "CP02" should be --CPØ2--.
Col. 17, line 19, "660" should be --600--;
line 22, "present" should be --preset--;
line 33, insert "and" after "flipflop 608--;
line 64, "142 FIG. 2)" should be --142 (FIG. 2)--;
line 66, "NM801" should be --NM8Ø1--.
Col. 18, line 22, "charged" should be --changed--;
line 25, "operator" should be --operators--;
lines 37-38, "CP01 and CP02" should be --CPØ1 and CPØ2--
line 40, "CP01 and CP02" should be --CPØ1 and CPØ2--.

UNITED STATES PATENT OFFICE

CERTIFICATE OF CORRECTION

Patent No. 3,991,271 Dated November 9, 1976

Inventor(s) Kenneth M. Branscome, William M. Heath, George E. Goode, Kenneth W. Heizer and Barrie O. Morgan It is certified that error appears in the above-identified patent and that said Letters Patent are hereby corrected as shown below:

Col. 21, line 9, delete "the" before "three";
line 17, "NM802" should be --NM8Ø2--;
line 24, "NM802" should be --NM8Ø2--;
line 29, "receivved" should be --received--;
line 61, "A previously" should be --As previously--.

Signed and Sealed this

*Sixth* Day of *September 1977*

[SEAL]

*Attest:*

RUTH C. MASON
*Attesting Officer*

LUTRELLE F. PARKER
*Acting Commissioner of Patents and Trademarks*